(12) United States Patent
Shin

(10) Patent No.: US 9,081,203 B2
(45) Date of Patent: Jul. 14, 2015

(54) OPTICAL IMAGE STABILIZER FOR CAMERA LENS ASSEMBLY

(75) Inventor: Doo-Sik Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 947 days.

(21) Appl. No.: 12/606,767

(22) Filed: Oct. 27, 2009

(65) Prior Publication Data
US 2010/0134887 A1     Jun. 3, 2010

(30) Foreign Application Priority Data
Nov. 28, 2008  (KR) .................. 10-2008-0120147

(51) Int. Cl.
*G02B 27/64*     (2006.01)
*G03B 5/00*      (2006.01)

(52) U.S. Cl.
CPC .............. *G02B 27/646* (2013.01); *G02B 27/64* (2013.01); *G03B 5/00* (2013.01); *G03B 2205/0023* (2013.01); *G03B 2205/0061* (2013.01)

(58) Field of Classification Search
CPC ..... G02B 27/64; G02B 27/644; G02B 27/646
USPC ............................ 348/208.99, 208.1–208.16; 359/554–557, 813–814, 823–824
See application file for complete search history.

(56) References Cited

U.S. PATENT DOCUMENTS 4,615,590 A * 10/1986 Alvarez et al. ................. 359/556
4,731,669 A *  3/1988 Hayashi et al. ............ 348/208.7
4,780,739 A * 10/1988 Kawakami et al. ............. 396/54
5,117,246 A *  5/1992 Takahashi et al. .............. 396/55
5,122,908 A *  6/1992 Sporer .......................... 359/557
5,266,988 A * 11/1993 Washisu ......................... 396/55
5,305,040 A *  4/1994 Enomoto ........................ 396/55
5,424,872 A *  6/1995 Lecuyer et al. ............... 359/811
5,444,512 A *  8/1995 Morizumi ....................... 396/55
5,633,756 A *  5/1997 Kaneda et al. ................ 359/554
5,745,800 A *  4/1998 Kanbara et al. ................ 396/55
5,768,016 A *  6/1998 Kanbara ....................... 359/557
5,822,122 A * 10/1998 Kuno et al. ................... 359/557
5,842,053 A * 11/1998 Ueyama et al. ................. 396/55
5,844,719 A * 12/1998 Wada ............................ 359/557
5,854,947 A * 12/1998 Imura ............................ 396/55
5,986,826 A * 11/1999 Kosaka et al. ................ 359/814

(Continued)

FOREIGN PATENT DOCUMENTS

JP         04039634 A  *  2/1992 ............. G03B 5/00
JP         10039350        2/1998
WO    WO 2007049639 A1 *  5/2007

*Primary Examiner* — Thong Nguyen
(74) *Attorney, Agent, or Firm* — The Farrell Law Firm, P.C.

(57) ABSTRACT

An optical image stabilizer for correcting an image blurred by shaking of a hand while an object is photographed using a mobile communication terminal is provided. The optical image stabilizer includes an image sensor. A lens assembly is mounted on an optical axis of the image sensor. A housing contains the lens assembly. A rotator provided between the housing and the lens assembly surrounding the lens assembly rotates the lens assembly around a first axis perpendicular to the optical axis and a second axis perpendicular to the first axis in engagement with the lens assembly. A driving member rotates the rotator around the first and second axes. The optical image stabilizer can be mounted in a miniaturized lightweight photographing device, so that a clear image can be captured even during vibration of a photographing device caused by hand-shaking.

16 Claims, 6 Drawing Sheets

(56) References Cited

U.S. PATENT DOCUMENTS

| | | |
|---|---|---|
| 6,226,459 B1 * | 5/2001 | Hamada et al. ............... 396/54 |
| 6,249,312 B1 * | 6/2001 | Broekaert ................. 348/219.1 |
| 6,992,700 B1 * | 1/2006 | Sato et al. ............... 348/208.2 |
| 7,372,190 B2 * | 5/2008 | Manabe ..................... 310/328 |
| 7,471,886 B2 * | 12/2008 | Hirota et al. ................ 396/52 |
| 8,040,126 B2 * | 10/2011 | Matsumoto ............. 324/207.11 |
| 2005/0259156 A1 * | 11/2005 | Kosaka et al. ............ 348/208.7 |
| 2009/0122406 A1 * | 5/2009 | Rouvinen et al. ............ 359/555 |
| 2010/0239237 A1 * | 9/2010 | Lee et al. .................... 396/55 |
| 2010/0309323 A1 * | 12/2010 | Shin et al. ............... 348/208.4 |

* cited by examiner

OPTICAL IMAGE STABILIZER FOR CAMERA LENS ASSEMBLY

PRIORITY

This application claims priority under 35 U.S.C. §119(a) to a Korean Patent Application filed in the Korean Intellectual Property Office on Nov. 28, 2008 and assigned Serial No. 10-2008-120147, the contents of which are incorporated herein by reference.

BACKGROUND OF THE INVENTION

1. Field of the Invention

The present invention relates generally to a camera lens assembly, and in particular, to an optical image stabilizer for a camera lens assembly, which corrects an image blurred by shaking of a user's hand (hereinafter, "hand-shaking") while an object is photographed using a digital camera or an optical device mounted in a mobile communication terminal.

2. Description of the Related Art

With the miniaturization of digital cameras and development of lightweight techniques, the use of mobile communication terminals having optical lenses and camera devices has increased. As the mobility of a camera lens assembly mounted in a mobile communication terminal increases, image blurring caused by fine vibrations or handshaking represents a serious impediment to high quality images. Moreover, frequent photographing during movement increases a need to correct for movement or vibration such as hand-shaking. Although high-resolution cameras have emerged with the development of optical technology, their effect is reduced due to image blurring caused by vibration, so that a need for an image stabilizer increases. Image stabilizing techniques can be roughly classified into two types.

A first type of image stabilization is an electronic image stabilization technique, that is, Digital Image Stabilization (DIS), and Electronic Image Stabilization (EIS), in which blurring is detected from a captured image to correct data stored in a camera device or a memory. The camera device receives a blurred image and generates a clear image by adjusting a position and a color electronically or using a program. The electronic image stabilization technique does not require high cost because separate mechanical and physical configurations are not required, and further because the technique is easily adopted due to few structural constraints. However, adjustment using a program requires a separate memory or a high-performance camera device. A photographing speed may decrease as time required for correcting of a blurred image increases. The extent to which an afterimage is removed using a program is limited, resulting in degradation of a correction rate.

A second type of image stabilization is referred to as Optical Image Stabilization (OIS). An optical image stabilizer detects a user's movements or hand-shaking and changes the position of an optical lens or a camera device. Therefore, blurring of the image formed in the camera device from vibrating is prevented, even during vibration of a photographing device. In the optical image stabilizer, installation of a separate correction device increases a manufacturing cost and requires additional installation space. However, the optical image stabilizer may project a clear image on a camera device and remove an afterimage, thereby maintaining a correction rate of 90% or more. When camera devices having the same performance are used, the camera device using the optical image stabilizer may capture a clearer image than camera devices using electronic image stabilizers. For these reasons, an optical image stabilizer is more widely used than an electronic image stabilizer in photographing devices with high-resolution requirements.

A correction technique using movement of an optical lens may be used in a digital camera or device having a space that is sufficiently large to have a driving unit for driving the optical lens. However, there is a limit in using the correction technique for small digital cameras or mobile communication terminals having space constraints. To solve the problem, a technique for correcting for vibration by moving a camera device has been actively studied. Japanese Patent Application Publication No. 10-39350 discloses an optical hand-shaking correction device. In the disclosed hand-shaking correction device, an X-axis piezoelectric element and a Y-axis piezoelectric element are arranged on the contour of an optical lens and a separate support is provided to support the X-axis and Y-axis piezoelectric elements, thereby causing the optical lens to contact with the driving axis of the X-axis or Y-axis piezoelectric element according to the extent of blurring of a captured image and moving the optical lens by a predetermined distance using frictional force. As such, to install a driving device such as a piezoelectric element on the contour of the optical lens, the outer diameter of the optical lens must be sufficiently large. As a result, the hand-shaking correction device is difficult to mount on a mobile communication terminal, where the length and outer diameter of a camera lens assembly are extremely limited.

Moreover, a difficulty in designing a small-size driving device and a raise in the manufacturing cost caused by an increase in the number of parts impede the cost competitiveness of a photographing device having the hand-shaking correction device embedded therein. In a contact driving device such as a piezoelectric element using frictional force with its driving axis, it is difficult to control the tolerance of a contact face and secure reliability due to malfunction resulting from abrasion of the contact face. A driving circuit for generating and applying a specific voltage waveform is required to drive the driving device such as a piezoelectric element, thus further increasing the manufacturing cost and imposing a limitation on the miniaturization of a photographing device.

Accordingly, a need exists for an optical image stabilizer for a camera lens assembly, which can miniaturize a camera lens assembly to be mounted in a portable electronic device such as a portable terminal and solve a resolution degradation problem due to hand-shaking.

SUMMARY OF THE INVENTION

The present invention is designed to address at least the problems and/or disadvantages described above and to provide at least the advantages described below. Accordingly, an aspect of the present invention is to provide an optical image stabilizer for a camera lens assembly, which can be embedded in a small-size and lightweight photographing device such as a super compact digital camera or a mobile communication terminal that enables the photographing device to capture a clear image even when the photographing device vibrates due to handshaking.

Another aspect of the present invention provides an optical image stabilizer for a camera lens assembly, which has a simple structure, is easy to control, and reduces its manufacturing cost by making it possible to rotate the entire camera lens assembly using a piezoelectric actuator with respect to X and Y axes and moving the camera lens assembly according to handshaking of a user.

Still another aspect of the present invention provides an optical image stabilizer for a camera lens assembly, which can ensure solidity and reliability of a product while facilitating miniaturization of the product.

According to an aspect of the present invention, there is provided an optical image stabilizer for a camera lens assembly. The camera lens assembly includes an image sensor; a lens assembly mounted on an optical axis of the image sensor; a housing having the lens assembly; a rotator provided between the housing and the lens assembly and surrounding the lens assembly, for rotating the lens assembly around a first axis perpendicular to the optical axis and a second axis perpendicular to a plane including the first axis, and engaged with the lens assembly; and a driving member for rotating the rotator around the first and second axes.

BRIEF DESCRIPTION OF THE DRAWINGS

The above and other aspects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF EMBODIMENTS OF THE INVENTION

Figure 1:
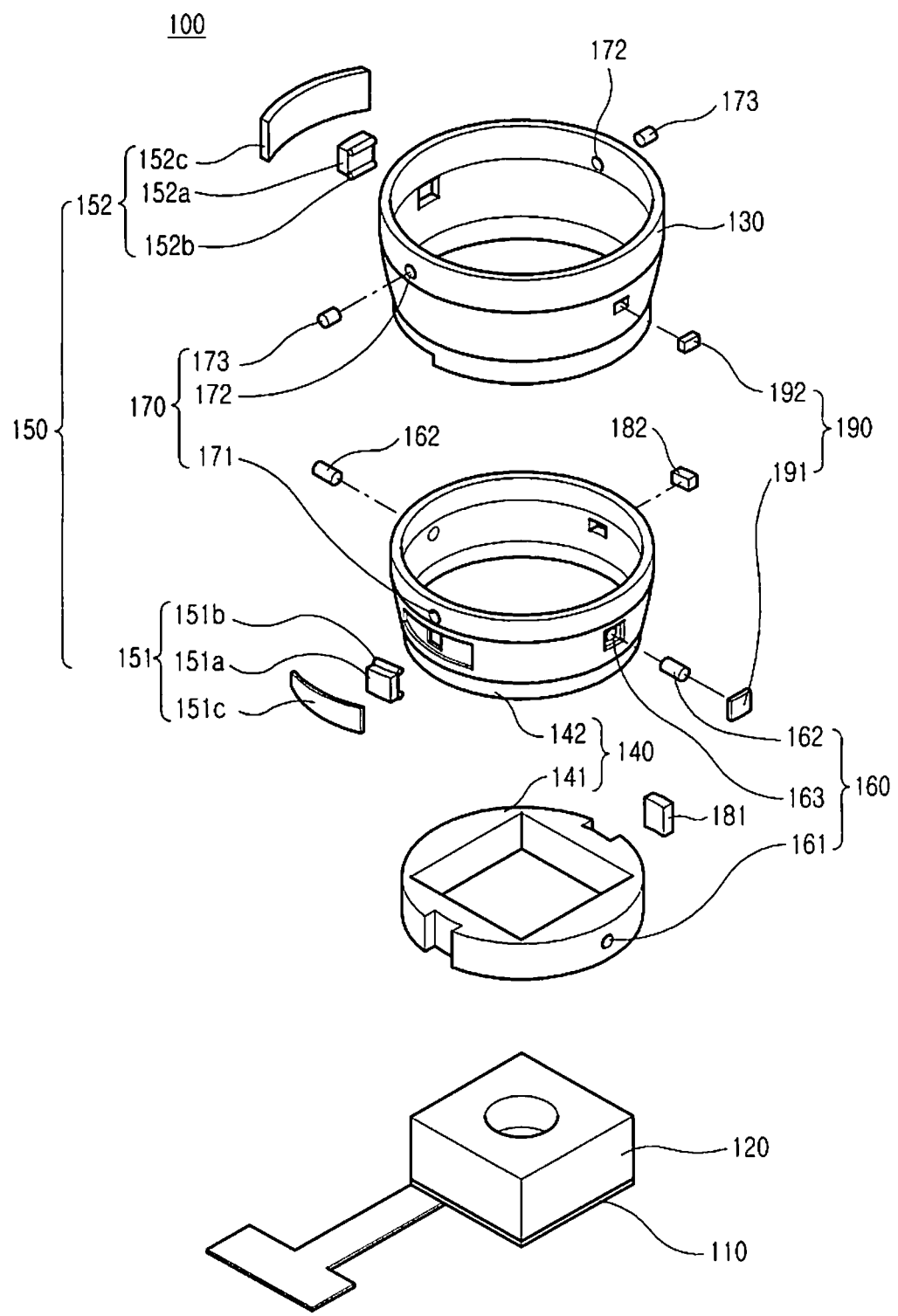
FIG. 1 is an exploded perspective view illustrating an optical image stabilizer for a camera lens assembly according to an embodiment of the present invention.

Embodiments of the present invention will now be described in detail with reference to the annexed drawings. In the following description, a detailed description of known functions and configurations incorporated herein has been omitted for clarity and conciseness.

As illustrated in FIGS. 1 to 8, a camera lens assembly 100 having an optical image stabilizer includes an image sensor 110, a lens assembly 120, a housing 130, a rotator 140, and a driving member 150. The lens assembly 120 is mounted on an optical axis Z of the image sensor 110, and the housing 130 houses the lens assembly 120. The rotator 140 surrounds the lens assembly 120 to be rotatable around each of a first axis Y perpendicular to the optical axis Z and a second axis X perpendicular to the first axis Y and the optical axis Z. The rotator 140 is engaged with the lens assembly 120 and provided between the housing 130 and the lens assembly 120. The driving member 150 is provided to rotate the rotator 140 around the first axis Y and the second axis X.

As illustrated in FIGS. 1 to 8, the rotator 140 includes a first axis rotator 141 and a second axis rotator 142. The first axis rotator 141 is engaged with the lens assembly 120 so as to rotate around the first axis Y, and is seated between the second axis rotator 142 and the lens assembly 120. The second axis rotator 142 is provided between the first axis rotator 141 and the housing 130 so as to rotate around the second axis X in the housing 130.

As illustrated in FIGS. 1 to 5, a first rotating portion 160 for rotating the first axis rotator 141 around the first axis Y in the second axis rotator 142 is provided on the first axis rotator 141 and the second axis rotator 142. The first rotating portion 160 is provided to couple the first axis rotator 141 to the second axis rotator 142. As illustrated in FIGS. 1, 2, 6, 7, and 8, a second rotating portion 170 is provided to rotate the second axis rotator 142 around the second axis X in the housing 130. The second rotating portion 170 is provided to couple the first axis rotator 141 to the housing 130.

As illustrated in FIGS. 1, 3, 4, and 5, the first rotating portion 160 includes one pair of first rotating grooves 161, one pair of first rotating holes 163, and one pair of first coupling members 162. The first rotating grooves 161 formed in an outer periphery of the first axis rotator 141 are formed at positions facing each other in a direction of the first axis Y. The first rotating holes 163 formed at positions facing each other in the second axis rotator 142 face the first rotating grooves 161. The first coupling members 162 pass through the first rotating holes 163 and are mounted in the first rotating grooves 161. The first axis rotator 141 is rotated around the first axis Y in the second rotator 142.

Figure 7:
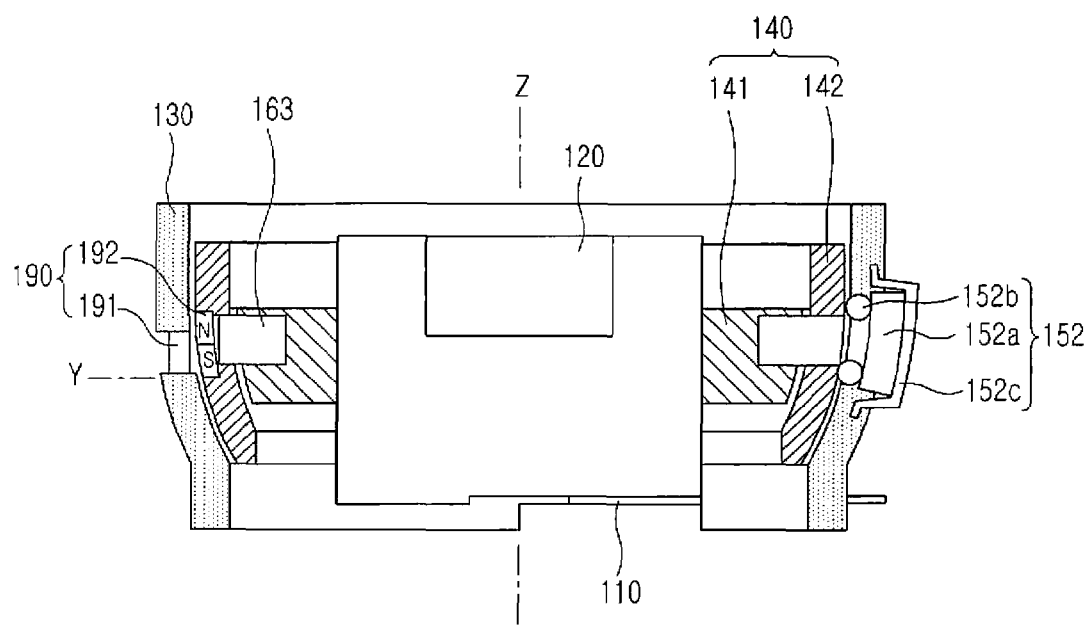
FIG. 7 is a cross-sectional view of the optical image stabilizer of FIG. 6 taken along line C-C'.
Figure 8:
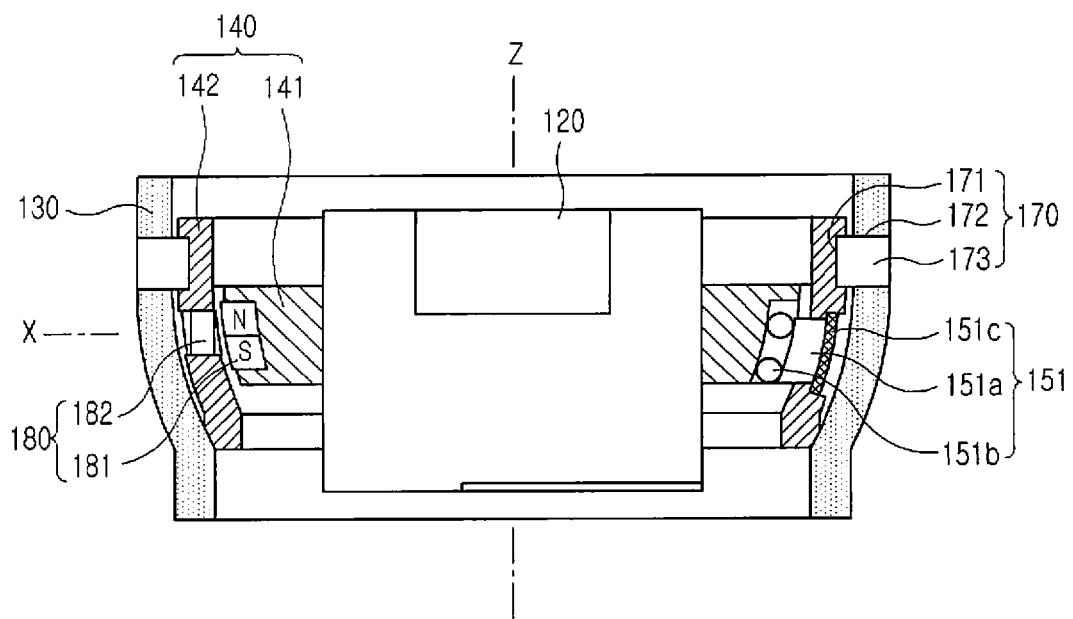
FIG. 8 is a cross-sectional view of the optical image stabilizer of FIG. 6 taken along line D-D'.

As illustrated in FIGS. 1, 7, and 8, the second rotating portion 170 includes one pair of second rotating grooves 171, one pair of second rotating holes 172, and one pair of second coupling members 173. The second rotating grooves 171 formed in an outer periphery of the second axis rotator 142 are formed at positions facing each other in a direction of the second axis X. The second rotating holes 172 formed in the housing 130 face the second rotating grooves 171. The second coupling members 173 pass through the second rotating holes 172 and are mounted in the second grooves 171. The second axis rotator 142 is rotated around the second axis X in the housing 130.

As illustrated in FIGS. 1 to 8, a first position-sensing portion 180 for sensing and controlling the rotation of the first axis rotator 141 in the second axis rotator 142 is provided on the first axis rotator 141 and the second axis rotator 142. A second position-sensing portion 190 for sensing and controlling the rotation of the second axis rotator 142 in the housing 130 is provided on the second axis rotator 142 and the housing 130.

As illustrated in FIGS. 1, 3, 5, and 9, the first position-sensing portion 180 includes a first permanent magnet 181 and a first position sensor 182. The first permanent magnet 181 is provided at a position intersecting the second axis X in the outer periphery of the first axis rotator 141. The first position sensor 182 is provided at a position, facing the first permanent magnet 181, in the second axis rotator 142.

As illustrated in FIGS. 1, 6, 8, and 9, the second position-sensing portion 190 includes a second permanent magnet 191 and a second position sensor 192. The second permanent magnet 191 is provided at a position intersecting the first axis Y in the outer periphery of the second axis rotator 142. The second position sensor 192 is provided at a position, facing the second permanent magnet 191, in the housing 130.

As illustrated in FIGS. 1, 3, 5, 6, and 9, the driving member 150 includes a first driving portion 151 and a second driving portion 152. The first driving portion 151 rotates the first axis rotator 141 in the second axis rotator 142, and the second driving portion 152 rotates the second axis rotator 142 in the housing 130.

Figure 4:
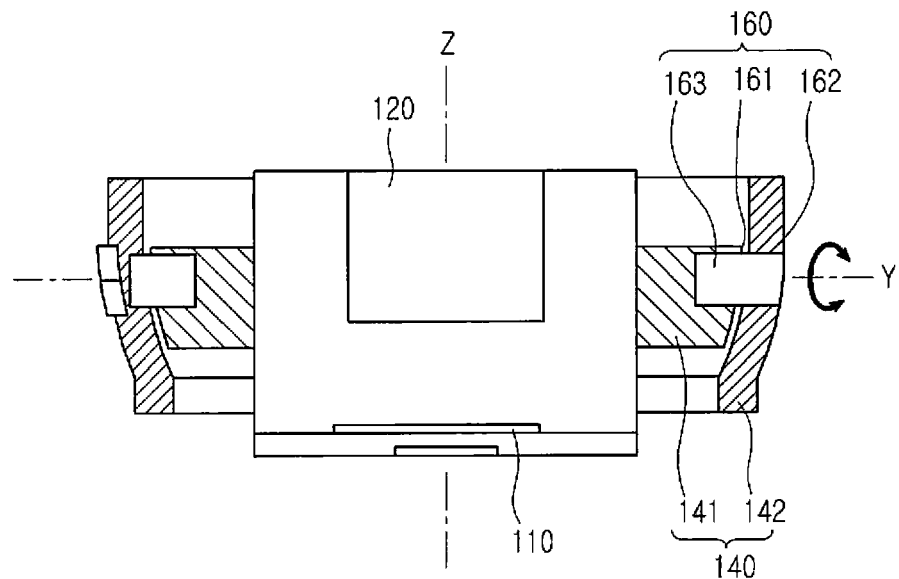
FIG. 4 is a cross-sectional view of the optical image stabilizer of FIG. 3 taken along line A-A'.
Figure 6:
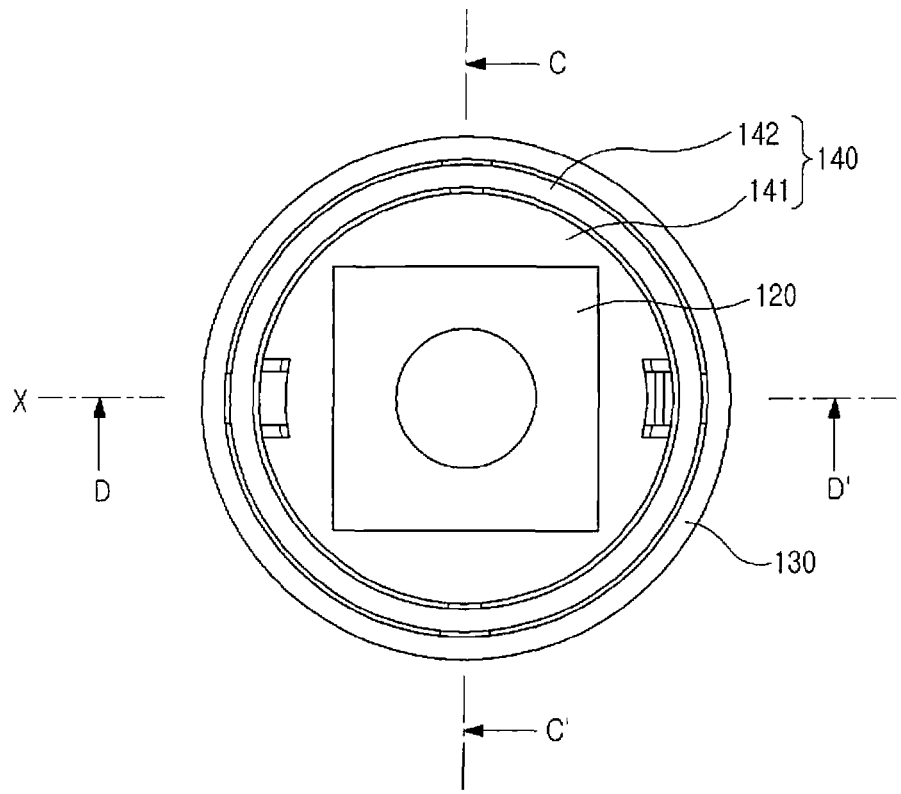
FIG. 6 is a plan view of an optical image stabilizer for a camera lens assembly in which a lens assembly, first and second axis rotators, and a housing are coupled according to an embodiment of the present invention.

As illustrated in FIGS. 1, 4, and 6, the first driving portion 151 includes a first piezoelectric actuator 151a and a first rotating tip 151b. The first piezoelectric actuator 151a, which is engaged with the first axis rotator 141, is provided on the second axis rotator 142. At least one first cylindrical rotating tips 151b is provided between the first piezoelectric actuator 151a and the first axis rotator 141. The first driving portion 151 further includes a first elastic member 151c provided on an outer side surface of the second axis rotator 142, for pressing the first piezoelectric actuator 151a to the first axis rotator 141.

As illustrated in FIGS. 1, 4, and 6, at least two first rotating tips 151b are provided. According to power supply to the first piezoelectric actuator 151a, the first rotating tips 151b are driven in different oval shapes on one face of the first piezoelectric actuator 151a. "Oval shapes" refers to a path of movement of the first rotating tips 151b. As illustrated in FIGS. 1 and 6, the first elastic member 151c is made of a plate spring.

As illustrated in FIGS. 1 and 8, the second driving portion 152 includes a second piezoelectric actuator 152a and a second rotating tip 152b. The second piezoelectric actuator 152a engaged with the second axis rotator 142 is provided on the housing 130. At least one second rotating tip 152b having a cylinder shape is provided between the second piezoelectric actuator 152a and the second axis rotator 142. The second driving portion 152 further includes a second elastic member 152c for pressing the second piezoelectric actuator 152a to the second axis rotator 142.

As illustrated in FIGS. 1 and 8, at least two second rotating tips 152b are provided. According to power supply to the first piezoelectric actuator 151a, the second rotating tips 152b are driven in different oval shapes on one face of the second piezoelectric actuator 152a. As illustrated in FIGS. 1 and 8, the second elastic member 152c is made of a plate spring.

The operation of the optical image stabilizer for the camera lens assembly having the above-described structure according to an embodiment of the present invention will be described in detail with reference to FIGS. 1 to 9.

Figure 2:
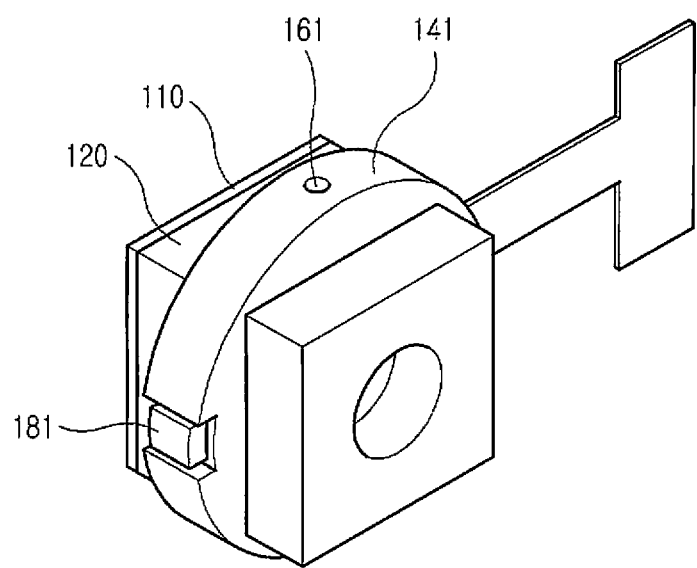
FIG. 2 is a perspective view of an optical image stabilizer for a camera lens assembly in which a first axis rotator is coupled to a lens assembly according to an embodiment of the present invention.

As illustrated in FIGS. 1, 7, and 8, the camera lens assembly 100 having the optical image stabilizer provided in a portable terminal or a portable electronic device such as a small camera includes the image sensor 110, such that the lens assembly 120 is provided facing in the direction of the optical axis Z of the image sensor 110, the rotator 140 having the first axis rotator 141 and the second axis rotator 142, the housing 130 surrounding the lens assembly 120 and the rotator 140, and the driving member 150 for rotating the rotator 140 around the first axis Y and the second axis X perpendicular thereto in the housing 130. As illustrated in FIG. 1, the optical axis is denoted by Z, the first axis perpendicular to the optical axis Z is denoted by Y, and the second axis perpendicular to the optical axis Z and the first axis Y is denoted by X. As illustrated in FIGS. 1, 6, 7, and 8, the rotator 140 includes the first axis rotator 141 and the second axis rotator 142. As illustrated in FIGS. 1 and 2, the first axis rotator 141 formed on the outer periphery of the lens assembly 120 is engaged with the lens assembly 120.

As illustrated in FIGS. 2, 3, 4, and 7, one pair of first rotating grooves 161 is formed in the outer periphery of the first axis rotator 141 on the first axis Y so as to form a rotating axis of the first axis rotator 141. The first rotating grooves 161 face each other.

As illustrated in FIGS. 2, 3, 5, and 8, the first permanent magnet 181 is provided on one face of the outer periphery of the first axis rotator 141 on the second axis X. The first rotating tips 151b, which are closely fastened by the first piezoelectric actuator 151a of the first driving portion 151, are seated on the other face of the first axis rotator 141. The first rotating tips 151b can be cylindrical metal rods. The first rotating tips 151b, which are disposed in the direction of the first axis Y, rotate the first axis rotator 141 when the cylinder-shaped outer periphery is rotated and driven in the oval shape according to close adhesion and drive of the first piezoelectric actuator 151a. The first piezoelectric actuator 151a passing through the second axis rotator 142 is provided on the first axis rotator 141. The plate spring 151c is formed on one face of the first piezoelectric actuator 151a so that the first piezoelectric actuator 151a can be closely fastened in a direction of the first axis rotator 141. Since the first rotating tips 151b are closely adhered to the first axis rotator 141 by the elastic force of the plate spring 151c, the first axis rotator 141 is rotated, while the first rotating tips 151b are rotated, when the first piezoelectric actuator 151a is powered on.

Figure 3:
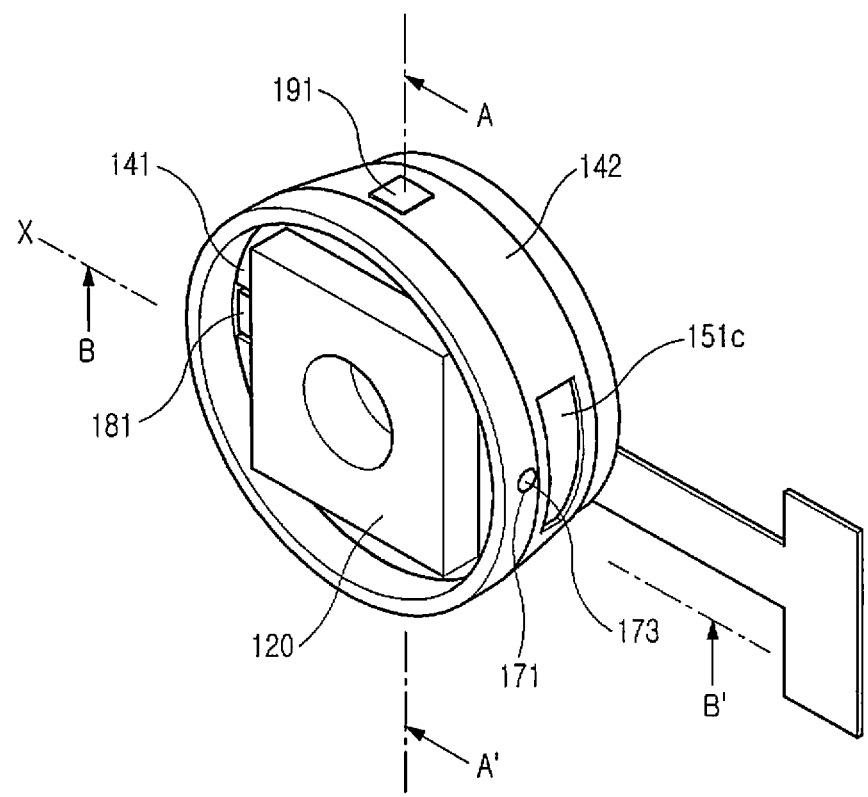
FIG. 3 is a perspective view of an optical image stabilizer for a camera lens assembly in which a lens assembly and first and second axis rotators are coupled according to an embodiment of the present invention.
Figure 5:
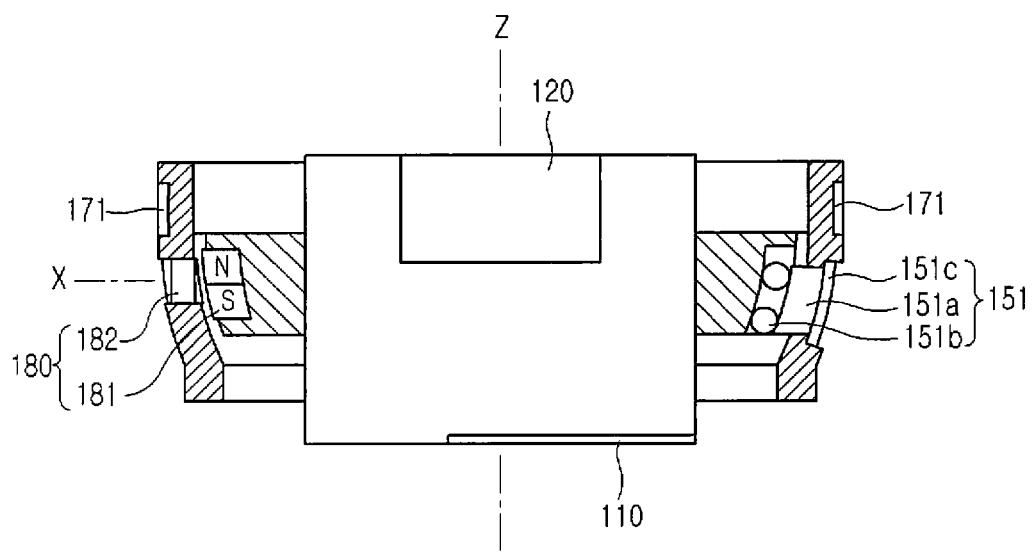
FIG. 5 is a cross-sectional view of the optical image stabilizer of FIG. 3 taken along line B-B'.

As illustrated in FIGS. 3, 4, and 7, the rotating holes 163 are formed in the outer periphery of the second axis rotator 142 on the first axis Y. As illustrated in FIGS. 3, 5, and 8, the first position sensor 152 is provided on one face of the outer periphery of the second axis rotator 142, along the second axis X. The position sensor 152 faces the first permanent magnet 181 so as to sense the rotation of the first permanent magnet 181 according to rotation of the first axis rotator 141. As described above, on one face of the outer periphery of the second axis rotator 142, the first piezoelectric actuator 151a of the first driving portion 151 is seated, and the plate spring 151c is provided to closely fasten the first piezoelectric actuator 151a to the first axis rotator 141. Accordingly, the first piezoelectric actuator 151a is closely fastened by the plate spring 151c, and the first rotating tips 151b are closely fastened to the first axis rotator 141. When the piezoelectric actuator 151a is powered on, the first rotating tips 151b are closely fastened between the first piezoelectric actuator 151 and the first axis rotator 141 and rotated in the oval shape, thereby rotating the first axis rotator 141.

As illustrated in FIGS. 1 and 5, the second permanent magnet 191 is provided in at least one of the first rotating holes 163 formed in the outer periphery of the second axis rotator 142, and faces the second position sensor 192 provided on the housing 130 in a state in which the first coupling member 162 is mounted in the first rotating hole 163. One pair of second rotating grooves 171 are formed in the outer periphery of the second axis rotator 142 on the second axis X so as to form a rotating axis of the second axis rotator 142 and formed to face each other. At least one of the second rotating grooves 171 formed on the second axis X are spaced from the first position sensor 182 by a predetermined length.

As illustrated in FIGS. 3 and 4, the first rotating grooves 161 are connected to the first rotating holes 163 in a state in which the second axis rotator 142 surrounds the first axis rotator 141. In this state, the first coupling member 162, which passes through the first rotating hole 163, is mounted in the first rotating groove 161, so that the first axis rotator 141 can be rotated around the first axis Y in the second axis rotator 142. As illustrated in FIGS. 6, 7, and 8, the housing 130 is provided on an outer side of the second axis rotator 142 so as to surround the second axis rotator 142. The second position sensor 192 facing the second permanent magnet 191 is provided on the outer periphery of the housing 130, along the first axis Y. The second position sensor 192 can sense a position change of the second permanent magnet 191, which is rotated when the second axis rotator 142 is rotated. The second driving portion 152, which is for rotating the second axis rotator 142 around the second axis X, is engaged with the second axis rotator 142 and provided on the outer periphery of the housing 130, on the first axis Y in the direction facing the second position sensor 192. The second rotating tips 152b of the second driving portion 152 are engaged with the second axis rotator 142. The second axis rotator 142 is configured to rotate around the second axis X while the second rotating tips 152b are rotated in the oval shape by the second piezoelectric actuator 152a. The second rotating tips 152b can be cylindrical metal rods. The second rotating tips 152b disposed in the direction of the second axis X rotate the second axis rotator 142 by rotating and driving the cylinder-shaped outer periphery according to close adhesion and drive of the second piezoelectric actuator 152a. The plate spring 152c, which closely fastens the second piezoelectric actuator 152a in the direction of the second axis rotator 142, is formed on one face of the second piezoelectric actuator 152a. Accordingly, the second piezoelectric actuator 152a is closely fastened by the plate spring 152c, and the second rotating tips 152b are closely fastened to the second axis rotator 142. When the second piezoelectric actuator 152a is powered on, the second rotating tips 152b, closely fastened between the second piezoelectric actuator 152a, and the second axis rotator 142 are rotated in the oval shape, thereby rotating the second axis rotator 142. On the outer periphery of the housing 130 on the second axis X, the second rotating hole 172 is formed at the same position as the second rotating groove 171 and passes through to the second rotating groove 171.

As illustrated in FIGS. 7 and 8, in a state in which the housing 130 surrounds the second axis rotator 142, the second rotating grooves 171 are connected to the second rotating holes 172. The second coupling member 173, which passes through the second rotating hole 172, is mounted in the second rotating groove 171 so as to rotate the second axis rotator 142 around the second axis X in the housing 130.

Figure 9:
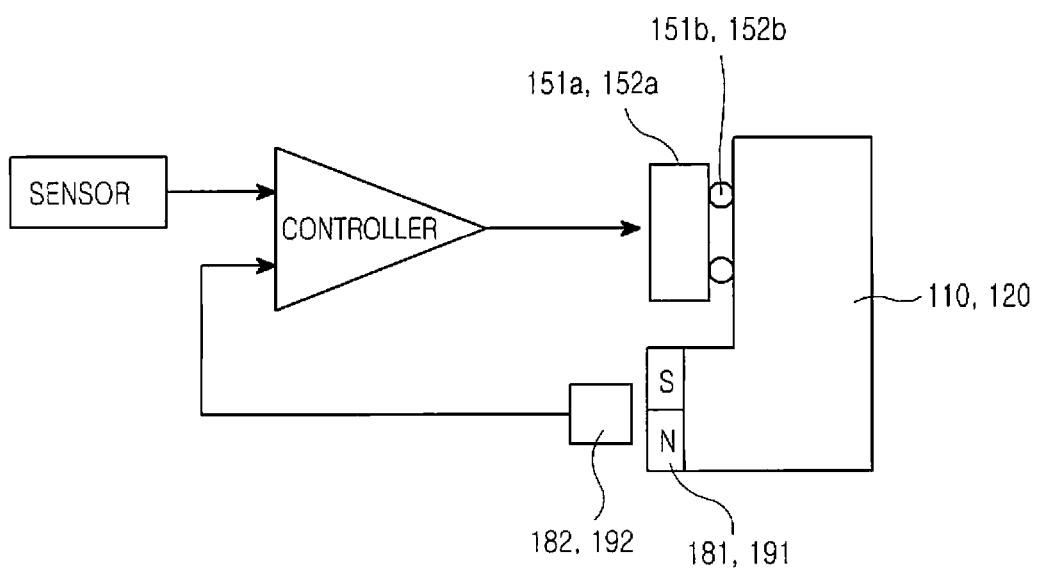
FIG. 9 is a block diagram of an optical image stabilizer for a camera lens assembly according to an embodiment of the present invention.

As illustrated in FIG. 9, when an image is captured using a camera lens assembly provided in a portable electronic device, a sensor provided inside the portable electronic device senses vibration of the camera lens assembly, due to hand-shaking, by driving the camera lens assembly 100.

The sensor, which may be a gyro sensor, senses a position change value according to a hand-shaking level. A controller controls the rotator 140 to be rotated around the first axis Y and the second axis X according to the position change value. Accordingly, when the first driving portion 151 and the second driving portion 152 are powered on, the rotator 140 is rotated around the first axis Y and the second axis X in the lens assembly 120 according to the hand-shaking level. When the first driving portion 151 and the second driving portion 152 are powered on, the form of the first piezoelectric actuator 151a is changed, and the first rotating tips 151b, which are engaged with the first piezoelectric actuator 151a, and the first axis rotator 141 are rotated in the oval shape. According to the rotation of the first rotating tips 151b, the first axis rotator 141 is rotated around the first axis Y. Also, the form of the second piezoelectric actuator 152a is changed, and the second rotating tips 152b, which are engaged with the second piezoelectric actuator 152a and the second axis rotator 142, are rotated in the oval shape. According to the rotation of the second rotating tips 152b, the second axis rotator 142 is rotated around the second axis X. When the first axis rotator 141 and the second axis rotator 142 are rotated around the first axis Y and the second axis X in the housing 130, the first position sensor 182 and the second position sensor 192 sense a position change value of the first permanent magnet 181 of the first axis rotator 141 and a position change value of the second permanent magnet 191 of the second axis rotator 142. Since the first position sensor 182 and the second position sensor 192 sense the position change values of the first axis rotator 141, and the second axis rotator 142 corresponds to the gyro sensor, the lens assembly 120 can move to an exact position corresponding to image. The lens assembly 120 can be rotated in two directions around the first axis Y and the second axis X using the position change values due to hand-shaking, so that image correction can be simplified and a clear image can be captured.

As is apparent from the forgoing description, an optical image stabilizer for a camera lens assembly includes first and second axis rotators for rotating the camera lens assembly around a first axis and a second axis perpendicular to a plane including the first axis. The optical image stabilizer, which is capable of changing a position of the camera lens assembly, can be further miniaturized than apparatuses using conventional technology that perform hand-shaking correction by moving a lens system. The optical image stabilizer is mounted in a miniaturized photographing device such as a super compact digital camera or a mobile communication terminal, so that a clear image can be easily captured.

The optical image stabilizer for the camera lens assembly is easily controlled and improves reliability of a product including the camera lens assembly, and further improves a correction rate by rotating the entire camera leans assembly around first and second axes so as to sense hand-shaking using a gyro sensor and correct a position according to the sensed hand-shaking. When hand-shaking sensed by the gyro sensor is corrected by use of position sensors for sensing rotations of first and second axis rotators, a clearer image can be obtained, since a position change for a correction can be exactly sensed.

While the present invention has been shown and described with reference to a certain embodiments thereof, it will be understood by those skilled in the art that various changes in form and details may be made therein without departing from the spirit and scope of the invention as defined by the appended claims.

What is claimed is:

1. An optical image stabilizer for a camera lens assembly, comprising:
   an image sensor;
   a lens assembly mounted on an optical axis of the image sensor;
   a housing in which the lens assembly is disposed;
   a first axis rotator surrounding and engaged with the lens assembly, wherein the first axis rotator is configured to rotate the lens assembly around a first axis that is perpendicular to the optical axis;
   a second axis rotator disposed between the first axis rotator and the housing, wherein the second axis rotator is configured to rotate the lens assembly around a second axis that is perpendicular to a plane including the first axis;
   a first driving portion extending from an outer surface of the second axis rotator, through the second axis rotator, to an outer surface of the first axis rotator, wherein the first driving portion is configured to rotate the first axis rotator around the first axis; and
   a second driving portion extending from an outer surface of the housing, through the housing, to the outer surface of the second axis rotator, wherein the second driving portion is configured to rotate the second axis rotator around the second axis.

2. The optical image stabilizer of claim 1, further comprising:
   a first rotating portion provided on the first axis rotator and the second axis rotator, for rotating the first axis rotator around the first axis in the second axis rotator; and
   a second rotating portion provided on the second axis rotator and the housing, for rotating the second axis rotator around the second axis in the housing.

3. The optical image stabilizer of claim 2, wherein the first rotating portion comprises:
   a pair of first rotating grooves facing each other in a direction of the first axis, and formed in an outer periphery of the first axis rotator;
   a pair of first rotating holes facing each other in the second axis rotator and facing the first rotating grooves; and
   a pair of first coupling members passing through the first rotating holes and mounted in the first rotating grooves,
   wherein the first axis rotator is configured to rotate around the first axis in the second rotator.

4. The optical image stabilizer of claim 3, wherein the second rotating portion comprises:
   a pair of second rotating grooves facing each other in a direction of the second axis, and formed in an outer periphery of the second axis rotator;
   a pair of second rotating holes formed in the housing and facing the second rotating grooves; and
   a pair of second coupling members passing through the second rotating holes and mounted in the second grooves,
   wherein the second axis rotator is adapted to rotate around the second axis in the housing.

5. The optical image stabilizer of claim 4, further comprising:
   a first position-sensing portion provided on the first axis rotator and the second axis rotator, for sensing and controlling rotation of the first axis rotator in the second axis rotator; and
   a second position-sensing portion provided on the second axis rotator and the housing, for sensing and controlling rotation of the second axis rotator in the housing.

6. The optical image stabilizer of claim 5, wherein the first position-sensing portion comprises:
   a first permanent magnet provided at a position intersecting the second axis in the outer periphery of the first axis rotator; and
   a first position sensor provided in the second axis rotator, and facing the first permanent magnet.

7. The optical image stabilizer of claim 6, wherein the second position-sensing portion comprises:
   a second permanent magnet provided at a position intersecting the first axis in the outer periphery of the second axis rotator; and
   a second position sensor provided at a position, facing the second permanent magnet, in the housing.

8. The optical image stabilizer of claim 1, wherein the first driving portion comprises:
   a first piezoelectric actuator provided on the second axis rotator and engaged with the first axis rotator;
   at least one first cylindrical rotating tip provided between the first piezoelectric actuator and the first axis rotator; and
   a first elastic member for pressing the first piezoelectric actuator to the first axis rotator.

9. The optical image stabilizer of claim 8, wherein at least two first cylindrical rotating tips are driven in different oval shapes on a face of the first piezoelectric actuator according to power supply to the first piezoelectric actuator.

10. The optical image stabilizer of claim 9, wherein the first elastic member comprises a plate spring.

11. The optical image stabilizer of claim 8, wherein the second driving portion comprises:
    a second piezoelectric actuator provided on the housing and engaged with the second axis rotator;
    at least one second cylindrical rotating tip provided between the second piezoelectric actuator and the second axis rotator; and
    a second elastic member for pressing the second piezoelectric actuator to the second axis rotator.

12. The optical image stabilizer of claim 11, wherein at least two second cylindrical rotating tips are driven in different oval shapes on a face of the second piezoelectric actuator according to power supply to the first piezoelectric actuator.

13. The optical image stabilizer of claim 11, wherein the second elastic member comprises a plate spring.

14. The optical image stabilizer of claim 1, wherein the first driving portion and the second driving portion each include a piezoelectric actuator.

15. An optical image stabilizer for a camera lens assembly, comprising:
    a lens assembly;
    a first axis rotator surrounding and engaged with the lens assembly, wherein the first axis rotator is configured to rotate the lens assembly around a first axis that is perpendicular to the optical axis;
    a second axis rotator disposed between the first axis rotator and a housing, wherein the second axis rotator is configured to rotate the lens assembly around a second axis that is perpendicular to a plane including the first axis;
    a first driving portion extending from an outer surface of the second axis rotator, through the second axis rotator, to an outer surface of the first axis rotator, wherein the first driving portion is configured to rotate the first axis rotator around the first axis; and
    a second driving portion extending from an outer surface of the housing, through the housing, to the outer surface of the second axis rotator, wherein the second driving portion is configured to rotate the second axis rotator around the second axis.

16. The optical image stabilizer of claim 15, wherein the first driving portion and the second driving portion each include a piezoelectric actuator.

* * * * *